UNITED STATES PATENT OFFICE.

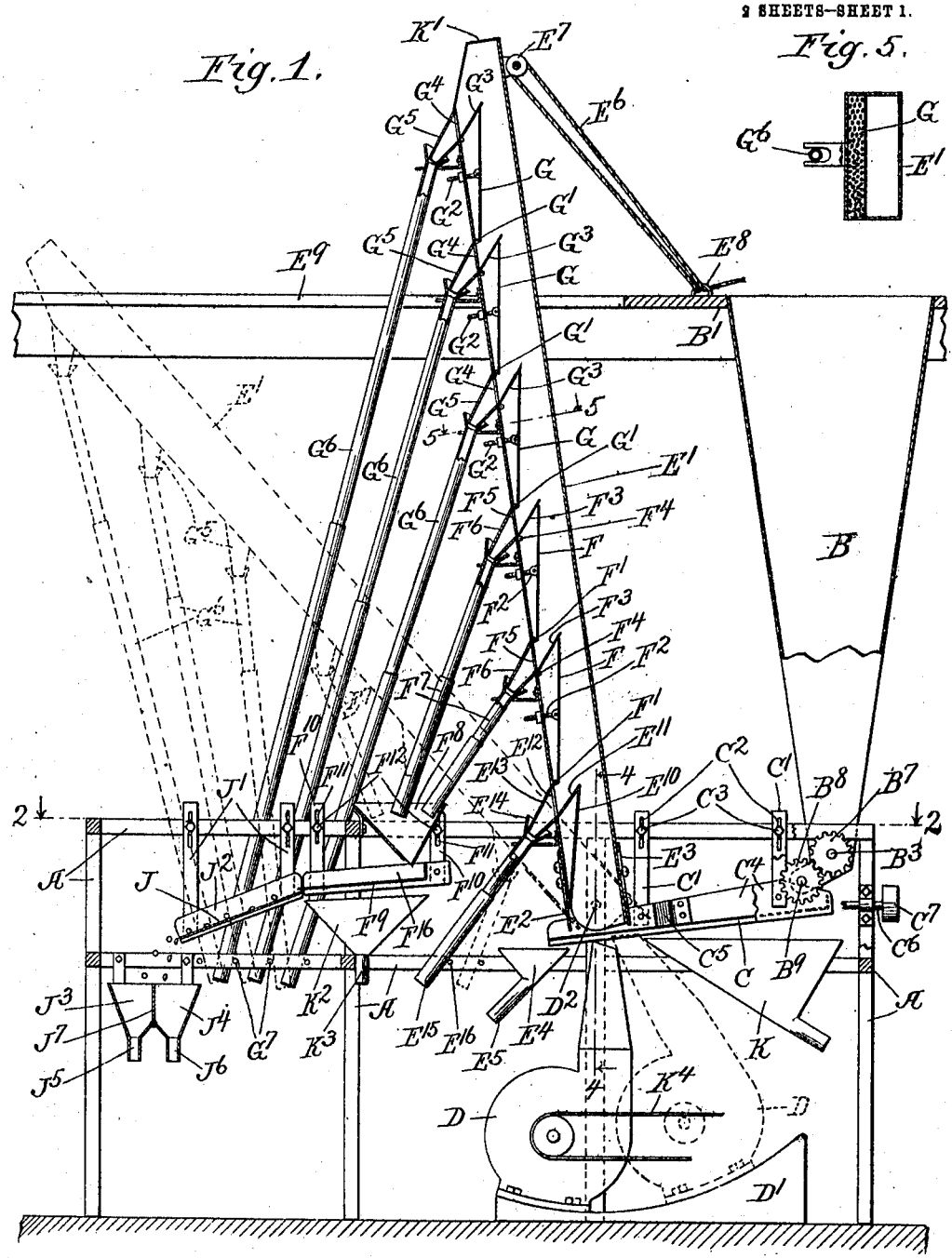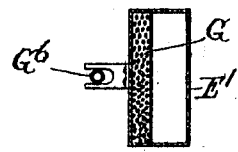

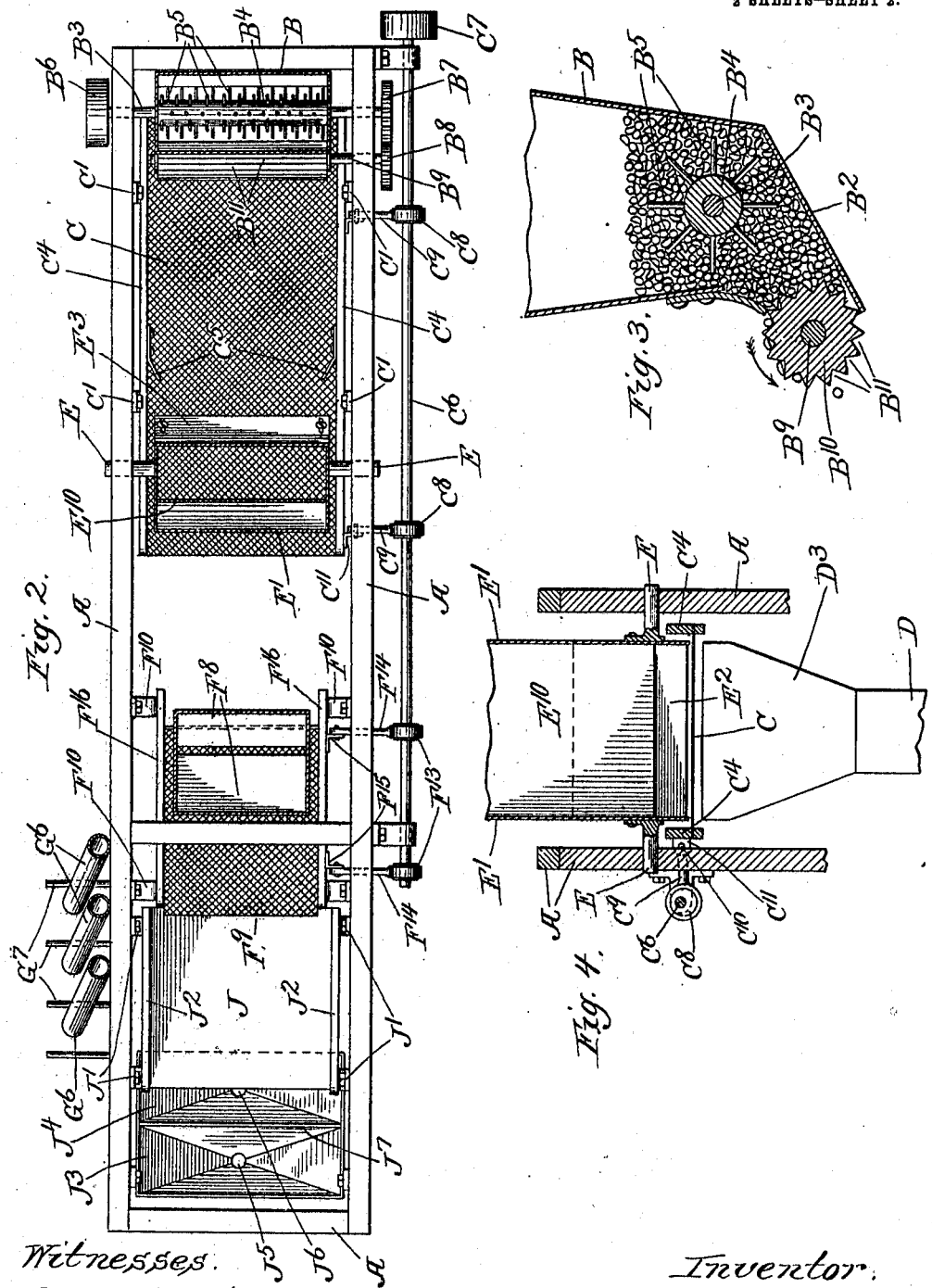

AXEL T. HEDFELDT, OF CHICAGO, ILLINOIS, ASSIGNOR TO HEDFELDT COMPANY, A CORPORATION OF ILLINOIS.

CLEANING AND SEPARATING MACHINE.

988,707. Specification of Letters Patent. Patented Apr. 4, 1911.

Application filed May 4, 1903. Serial No. 155,485.

*To all whom it may concern:*

Be it known that I, AXEL T. HEDFELDT, a citizen of the United States, residing at Chicago, in the county of Cook and State of Illinois, have invented a certain new and useful Improvement in Cleaning and Separating Machines, of which the following is a specification.

My invention relates to machinery for cleaning and separating grain, berries, seeds and the like and has for its object to provide certain new and useful devices and arrangements and combinations of devices whereby the cleaning process may be carried on in an effective manner.

One form of my invention, or one device or machine in which my invention is utilized, is shown in the accompanying drawings, which is intended to be to a degree diagrammatic and illustrative of the principles of my invention, wherein—

Figure 1 is a part sectional and part side elevation of my machine, with the parts shown in different positions, as indicated in dotted lines; Fig. 2 is a horizontal section on line 2—2, Fig. 1, with certain parts omitted; Fig. 3 is a detail section of the lower part of the supply hopper; Fig. 4 is a detail cross section on line 4—4, Fig. 1; Fig. 5 is a detail horizontal section on line 5—5, Fig. 1.

Like parts are indicated by the same letter in all the figures.

A A are the various frame pieces on which the several operative parts are supported.

B is a supply hopper of any suitable size or shape, in this case shown as opening at the floor $B^1$. At its lower end it terminates in a forwardly projecting portion $B^2$ and it contains a shaft $B^3$, which carries a drum $B^4$ and a series of projecting rods $B^5$. The shaft is provided with a driving pulley $B^6$ at one end and a gear wheel $B^7$ at the other, which latter gear wheel meshes with the gear wheel $B^8$ on the shaft $B^9$, which carries a drum $B^{10}$ having grooves $B^{11}$ on its outer surface. This drum occupies the outer opening of the forwardly projecting portion $B^2$, as indicated in Fig. 3. The several parts are suitably supported on the frame portions.

C is a screen supported by the flexible straps $C^1$ and these straps are slotted at the upper ends, as indicated at $C^2$, and are secured by the set bolts $C^3$, so that the supporting straps are adjustable as to length, to vary the inclination and position of the screen. This screen has side portions $C^4$, so that it forms a sort of trough, and is provided with the inwardly projecting part $C^5$ to direct the flow of material.

$C^6$ is a shaft, having a driving pulley $C^7$ thereon and the eccentrics $C^8$ $C^8$, from each of which projects an arm $C^9$ and this arm is pivotally connected at $C^{10}$ to the lug $C^{11}$ on the side portion $C^4$ associated with the screen C. When the shaft $C^6$ is rotated, the screen is rocked laterally.

D is a fan, which is preferably mounted on the base $D^1$, so that it may be adjusted about the pivot line $D^2$, as indicated in dotted lines in Fig. 1. I have not shown the details of this support, but the base of the fan should be detachably secured to its support so that it can be swung into any desired position and be there secured. The face of the support will be the arc of a circle, whose center is the pivot line $D^2$. Coincident with this pivot line $D^2$ is the center of the axle E, which is journaled in the frame pieces A and has secured to it in any desired manner the lower end of the air-chute $E^1$. Thus, the air-chute is supported so as to be moved about the pivot line $D^2$. At the forward side of the air-chute $E^1$ is secured the vertically adjustable extension $E^2$ and at the rear side is secured a similar vertically adjustable extension $E^3$. These extensions are adjusted when the air-chute is moved about its pivot line.

$E^4$ is a hopper associated with the discharge pipe $E^5$ and placed so as to receive the material which passes over the end of the screen C. The air-chute $E^1$ is adjustably supported by means of the rope $E^6$ passing over the pulley $E^7$ and through the eye $E^8$. There is a slot $E^9$ in the floor $B^1$ to permit the air-chute to be adjusted as to its angle of inclination.

$D^3$ is a flattened and widened discharge end of the fan, which opens below the screen C and below the open end of the air-chute $E^1$.

$E^{10}$ is an inclined sheet metal diaphragm in the air-chute and its upper end is connected by a like diaphragm $E^{11}$ with the opening $E^{12}$ which leads to the chute $E^{13}$, which in turn discharges into the funnel $E^{14}$ at the upper end of the discharge pipe $E^{15}$, which rests loosely upon the pin $E^{16}$.

F F are screens within the air-chute, pivoted each at the point $F^1$ and provided each with an adjusting device $F^2$, whereby their angles of inclination may be varied. Each is associated with a screen $F^3$, which is pivoted at $F^4$ and lies upon the top of the screen F. These screens $F^3$ lead to openings $F^5$, which are associated with the discharge funnels $F^6$ $F^6$, from which lead the pipes $F^7$ $F^7$ to the hopper $F^8$, which is open at the bottom and discharges upon the screen $F^9$. This screen, in a manner somewhat similar to the screen C, is supported by the straps $F^{10}$ adjustably secured by means of the slots $F^{11}$ and the set screws $F^{12}$, and it is connected with the shaft $C^6$ by means of the eccentrics $F^{13}$ and the rods $F^{14}$ and the angle-bars $F^{15}$. The screen of course has side plates $F^{16}$ to keep the material from falling off from it.

G G are screens within the air-chute, each hinged at $G^1$ and adjustably supported by the pivoted screw $G^2$ and associated above with a pivoted screen $G^3$, which lies upon the top of the screen G. The screens $G^3$ lead to openings $G^4$, which are associated each with a funnel-like projection $G^5$, which opens into a pipe $G^6$, which pipes discharge below into any convenient hopper or other place. These pipes $G^6$ are kept in position by the pins $G^7$.

J is a fixed inclined metal sheet, supported by the hangers $J^1$ $J^1$ and provided with a side bar $J^2$ and projecting up under the edge of the screen $F^9$. Its forward end discharges into a receiver, which consists of the two hoppers $J^3$ $J^4$, each of which terminates below in a pipe $J^5$ $J^6$, which pipes are separated by a partition $J^7$. These pipes $J^5$ and $J^6$ can lead to any desired receptacles and the partition $J^7$ may be adjustable in position.

K is a discharge trough placed beneath the screen C and adapted to discharge such material as may pass through the screen.

$K^1$ is a screen which covers the top of the air-chute, to prevent the escape of any material.

$K^2$ is a hopper beneath the screen $F^9$, which terminates in the discharge pipe $K^3$.

$K^4$ is a driving pulley which drives the moving parts of the fan D.

I have shown no driving mechanism, as any convenient motive power can be used.

I will use the word "sorting" as broadly including both the idea of cleaning and separating. In other words, the apparatus can be used for separating undesirable or desirable materials, or for cleaning materials, or for sorting materials which may all of them be useful, but which are mixed together.

It will of course be understood that I do not wish to be limited to the particular form, size or shape of the several parts which I have illustrated and described. My drawings are to be taken as diagrammatic in the sense that they are intended to show in a general way the idea of my invention and I anticipate that any mechanic familiar with the subject matter will easily be able to suggest alterations and variations. For example, the air-chute can be made, if desired, very much longer, so that it operates both as a conveyer and a cleaning device. Thus, the devices which I have shown as serving to clean might be located far up along the air-chute and the material might be brought in on the screen and be driven up the air-chute by a sufficiently strong blast of air and be then separated or cleaned at the upper portion of the air-chute. The angle of inclination of the several parts also may be varied, and indeed must be varied to suit different conditions. The number of openings in the air-chute may be increased or diminished and they may be grouped in a different manner from that here shown. The essential features, however, of my invention are here shown and suggested.

The use and operation of my invention are as follows: The grain, seeds, or other material to be cleaned, elevated or treated by my apparatus, is conveniently introduced over the screen C in the manner suggested. It is stirred up and the parts are separated as far as may be possible by means of the separating hopper B and its associated parts. They are then delivered by the distributing roll or drum $B^4$ over the agitated screen C and here the smaller particles are sifted out and carried away as waste. As the material travels down over the screen, it encounters the air blast just below the air-chute and everything except that which is too heavy to be lifted by the air blast is driven up into the chute. Such heavier material is discharged over the end of the screen into the hopper $E^4$ and carried away as desired. The material is now carried up into the air-chute, being fed upwardly or outwardly according to the shape and angle of inclination of the air-chute, but the parts are so adjusted that when the material rises to a certain point its heavier portions will drop into the first discharge pipe $E^{15}$. Metal, stone and the like can thus be carried away and there may obviously be more than one of these heavy waste discharge pipes and they may be grouped in any desired manner. In certain cases, where the material is free from such heavy particles, it will not be necessary perhaps to use these heavy waste discharge pipes, and in this event the mouth or mouths of such pipes will be temporarily closed. As the material passes up, by the air passing freely through the screens within the air-chute, and as it reaches the screens associated with the discharge pipes, the heavier matter, in this case being grain or material to be cleaned, becomes too heavy and drops into its discharge pipes $F^7$. It will be observed that the parts are so situated that as the material passes along upwardly in the air-chute, when it gets to the point where gravity overcomes the action of the air, its fall will not take it on down to the bottom of the chute, but into the pipe opening. The movement of the air in the chute is therefore at an angle to the direction of the action from the force of gravity. The discharge pipes $F^7$, and there may be one or more of them in any desired group or arrangement, I call, to distinguish them from the waste pipes, the grain discharge pipes, not meaning thereby to limit their use to any particular material. The material that passes down the grain discharge pipes is discharged upon the agitated screen $F^9$. Any waste material is dropped into the hopper below the screen and carried away and the good material passes on to the inclined chute J.

In certain classes of material, there will be found to be two classes of grain, those individuals which are flat on one side and those which are comparatively round. It may be necessary to separate these into two classes, and, since the flat portions will be inclined to slide down the chute and the round ones to roll, the latter will move farther than the former, and as indicated in Fig. 1 they can be more or less satisfactorily divided into two classes by adjusting the partition $J^7$. The lighter materials, usually waste materials, will continue to move upwardly under the action of the air in the air-chute and in like manner will be gathered into the light waste discharge pipes $G^6$ $G^6$. Here again any desired number and grouping of these pipes may be effected. I have called them waste pipes simply for lack of a better term. The whole series of discharge pipes taken together may be adjusted and arranged so as to adapt themselves to any particular use, that is so as to fit the machine for the treatment of different kinds of material. It might happen that the material to be collected would be the lightest material in the mass, in which event the highest pipes would be the so-called grain discharge pipes or the pipes for collecting the useful material, and it is for this reason that I have stated above that I do not wish to be understood as limiting my invention by the employment of terms which are applicable to particular materials, as is the case with the particular machine here illustrated.

This application relates to the same subject matter as that of my co-pending application No. 170,403, filed August 22, 1903.

I claim:

1. In a device for handling material, the combination of an air-chute pivotally supported, with a separate air blast device adapted to discharge into the lower end of the air-chute, and separate adjustable supports for the air chute and the air blast device, whereby they may be moved and both may be brought to a common axis.

2. In a device for sorting material, the combination of an air-chute inclined from the vertical and having an unobstructed passageway for the material therethrough, with a perforated or screen-like diaphragm across and near to its lower end, an air blast device discharging below and through such perforated diaphragm and into the chute, means for conveying material onto the diaphragm below the air-chute so that it will be carried up by the air blast, a series of discharge apertures arranged at intervals along the lower side of the inclined chute and associated with each of said apertures an inwardly projecting device to intercept the material as it falls.

3. In a device for sorting material, the combination of an air-chute inclined from the vertical, with a perforated or screen-like diaphragm across and near to its lower end, an air blast device discharging below and through such perforated diaphragm and into the chute, means for conveying material onto the diaphragm below the air-chute so that the particles thereof will be carried up by the air blast to altitudes proportioned inversely to the weight of such particles, a series of discharge apertures arranged at intervals along the lower side of the inclined chute to receive such material as the blast becomes spent, and means for adjusting the angle of inclination of the chute.

4. In a device for sorting material, the combination of an air-chute inclined from the vertical, with a perforated or screen-like diaphragm across and near to its lower end, an air blast device discharging below and through such perforated diaphragm and into the air-chute, means for conveying the material onto the diaphragm so that it will be carried up by the air blast, and a series of discharge apertures arranged at intervals along the lower side of the inclined chute, such discharge apertures associated with inclined perforated screens to contract the cross section of the air-chute in proximity with each of such apertures.

5. In a device for sorting material, the combination of an air chute inclined from the vertical, with a perforated or screen like diaphragm across and near to its lower end, an air blast device discharging through such diaphragm and into the chute, means for conveying material onto the diaphragm so that it will pass into the chute above the air blast device and be carried upward by the blast, a series of discharge apertures arranged at intervals along the lower side of the chute and associated with each of said apertures, an inwardly projecting device having an inclined upper surface conducting to such aperture.

6. In a device for sorting material, the combination of a straight air chute inclined from the vertical, with a perforated or screen like diaphragm across and near to its lower end, an air blast device discharging through such diaphragm and into the chute, means for conveying material onto the diaphragm so that it will pass into the chute above the air blast device and be carried upward by the blast, a series of discharge apertures arranged at intervals along the lower side of the chute and associated with each of said apertures, an inwardly projecting device having an inclined upper surface conducting to such aperture.

7. In a device for sorting material, the combination of an inclined chute having a free and unobstructed passageway therethrough with an air blast device discharging into such chute at the lower end, means for introducing the material into the chute in a relatively thin film or sheet transverse to the axis of the chute, a perforated diaphragm across such chute to receive such material, a series of discharge apertures at different points along one side of the chute, and means for intercepting and conducting the material to said discharge apertures and a feeding hopper containing a cleaning pin roll and a feeding roll at the mouth of the hopper adapted to discharge onto the screen in the chute.

8. In a device for sorting material, the combination of an inclined chute having a free and unobstructed passageway therethrough with an air blast device discharging into such chute at the lower end, means for introducing the material into the chute in a relatively thin film or sheet transverse to the axis of the chute, a perforated diaphragm across such chute to receive such material, a series of discharge apertures along the lower side of the chute, and associated therewith intercepting devices, the part of said chute along the upper inclined wall constituting an uninterrupted passageway for the material and a feeding hopper containing a cleaning pin roll and a feeding roll at the mouth of the hopper adapted to discharge onto the screen in the chute.

9. In a device for sorting material, the combination of an inclined chute with an air blast device discharging into such chute at its lower end, means for carrying the material in a thin film or sheet to the chute in a plane transverse to its axis and above the discharge point of the air blast device, a series of discharge apertures at different points along one side of the chute and means for conducting the material to such discharge apertures.

AXEL T. HEDFELDT.

Witnesses:
HOMER L. KRAFT,
FANNY B. FAY.

---

Copies of this patent may be obtained for five cents each, by addressing the "Commissioner of Patents, Washington, D. C."